Figure 1:
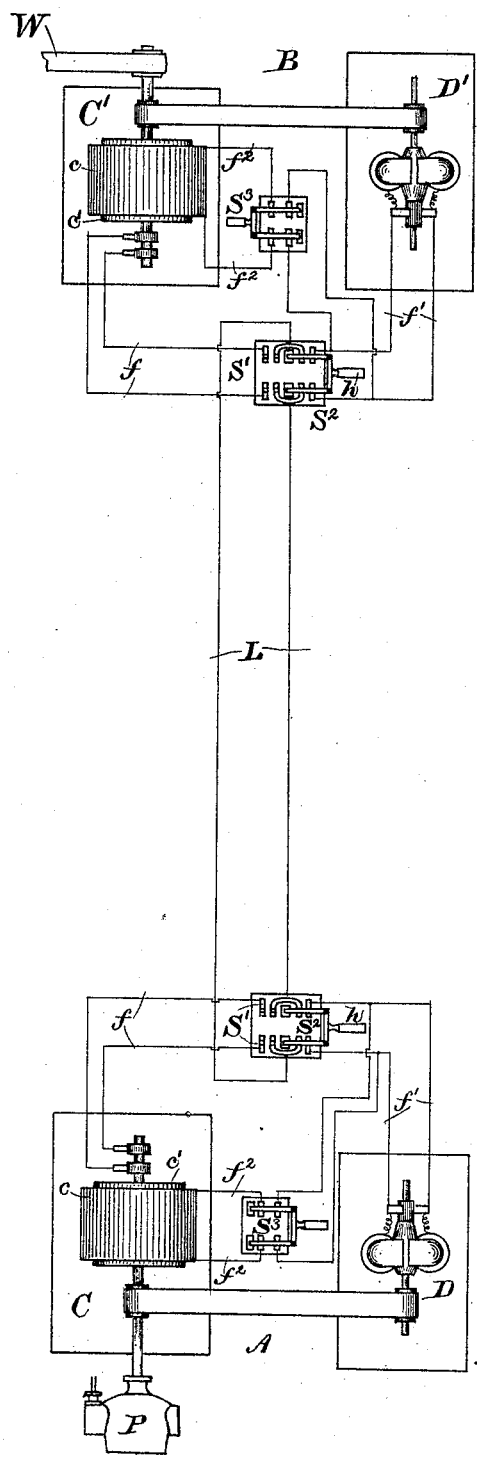

(No Model.) 2 Sheets—Sheet 2.
E. W. RICE, Jr.
ELECTRIC TRANSMISSION OF POWER.
No. 485,659. Patented Nov. 8, 1892.
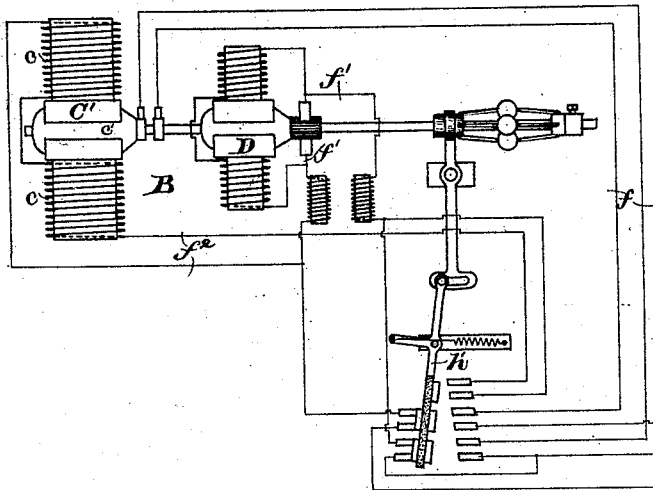
FIG. 2.
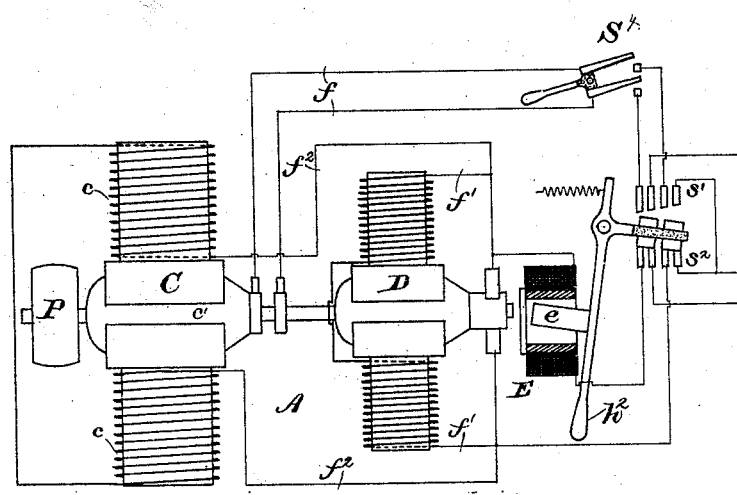
WITNESSES: INVENTOR:
Edwin Wilbur Rice Jr
by Bentley & Blodgett
ATTYS.

UNITED STATES PATENT OFFICE.

EDWIN WILBUR RICE, JR., OF LYNN, MASSACHUSETTS, ASSIGNOR TO THE THOMSON-HOUSTON ELECTRIC COMPANY, OF CONNECTICUT.

ELECTRIC TRANSMISSION OF POWER.

SPECIFICATION forming part of Letters Patent No. 485,659, dated November 8, 1892.

Application filed September 18, 1891. Serial No. 406,119. (No model.)

*To all whom it may concern:*

Be it known that I, EDWIN WILBUR RICE, Jr., a citizen of the United States, residing at Lynn, in the county of Essex and State of Massachusetts, have invented certain new and useful Improvements in Electric Transmission of Power, of which the following is a specification.

This invention relates to a system of electric-power transmission employing alternating-current motors. Motors of this class have been devised which are quite efficient, but require an auxiliary starting means and means for maintaining their field magnetism by a direct current.

My invention consists, chiefly, in causing a single direct-current auxiliary machine to serve for both these purpose—namely, to first act as a motor, taking current from a direct-current supply to start the main motor, and to then act as a generator driven by the main motor and feeding the field-magnets thereof with a direct current.

In the system hereinafter described but one set of mains is employed, and switches are employed whereby connection is first made through such mains between two direct-current machines, one of which thus starts the other, bringing an alternating-machine connected therewith up to speed, and connections are then made through such mains between such alternating-machine and an alternator at the generating-station, whereby the movement of the alternating-motor is maintained.

In the accompanying drawings, Figure 1 is a diagram of a system adapted for carrying out the above-described mode of operation, the changing of the direct-current-machine connections, and thereby its function, being effected by manually-operated switches. Fig. 2 similarly shows a system wherein this change is automatically effected.

In Fig. 1, A is the generating-station, and B the receiving-station connected by a single set of mains L L. At the generating-station are provided the direct-current generator D and the alternator C, both of which are driven from suitable sources of power P, being for this purpose mechanically connected to the same prime motor. At the receiving-station are provided the alternating-current motor C' and direct-current machine D', which are mechanically connected together and to the work W. Such alternating-current motor may be of the type indicated, with an external stationary field-magnet $c$ and a revolving armature $c'$. At each station are provided connections $f$ between the supply-lines L L and the alternating-machine armatures $c'$, connections $f'$ between the supply-lines L L and the direct-current machine D or D', and connections $f^2$ between the direct-current machine and the field-magnet $f$ of the alternating-machine. Switches S' S² S³ are included, respectively, in such connections. As shown, switching-contacts S' S², leading from the supply-line, respectively, to the alternating and the direct current machines, are operated by a common handle $h$. To start the system in operation, the prime motor and the generating-machines C D having been set in motion, the attendant at each station closes switch-contacts S² and opens switch-contacts S' S³. The direct-current machines are thus connected through the supply-lines, and machine D', acting as a motor, starts the alternating motor and brings the same to speed. Then the switches S³ S³ are closed to excite the field-magnet circuits of the alternating machines, and handles $h$ are thrown, opening switch-contacts S² and closing switch-contacts S'. This cuts the supply-line off from the direct-current machines and causes it to form the connection between the armatures of the alternating machines, so that they then rotate in synchronism, the field-magnet of each machine being energized by a direct-current machine at its own station. Thus the energy required to maintain the excitation of the alternate motor field-magnets is transmitted by the alternating current, and but one set of supply-lines is needed.

In Fig. 2 I indicate a means for effecting the above-described change in the connections automatically when the motor has been brought up to speed. In this case the three sets of switch-contacts S' S² S³ at the motor-station are operated simultaneously by a common switch $h'$, which is actuated by a governor or speed-responsive mechanism driven by the motor itself, so that when full speed is attained the switch is thrown, preferably by a snap action, as shown. In conjunction with this a similar switch may be provided at the generating-station, its handle $h^2$ being controlled by an electro-magnetic device E in the starting connection from the direct-current machine to the supply-lines. This electro-magnetic device releases its armature $e$ when the direct-current-supply circuit is broken at the receiving-station during the change of connection, and the switch $h^2$, being thus released, at once cuts out the electro-magnetic device and shifts the supply-circuit connections to the armature of the alternator. The switch $S^3$ is omitted in this figure, as it is not necessary to the operation of the system, especially at the generating-station, as the direct-current machines may, as shown, be permanently connected to the alternator-field. An additional switch $S^4$ may, if desired, be included in the connection from the alternator-armature.

It is obvious that my invention as above described, may be modified and extended in many other ways without departing from the principle thereof. Thus it is of course not limited to a single set of generators and receivers nor to the common source of power for the two generators. Any number of generating-machines and any number of receiving-machines may be employed, and they may be connected in various ways. In fact, while I have shown a single set of mains for both the alternating and direct current machines, my invention is not altogether limited to this feature, as it consists, broadly, in the means whereby the same direct-current motor is employed as a motor to start the alternating motor, and as a dynamo to excite the field-magnet thereof. It will also be understood that the terms "field-magnet" and "armature" as herein applied, to the alternating machines refer, respectively, to the part of the machine receiving direct current and the part receiving alternating current, so that either the field-magnet or the armature may rotate according to the design of the machine. Furthermore, one side of the set of supply-mains L L may obviously be a ground return. Of course transforming devices for changing the potential may be included in the alternator connections at one or both ends of the system.

What I claim as new, and desire to secure by Letters Patent, is—

1. In a system of electric-power transmission, the combination of generating and receiving stations, each having a direct-current machine and an alternate-current machine, supply connections between the machines of the two stations, connections at the receiving-station between the direct-current machine and the field of the alternating machine, and switching devices at such station, one in the connections from the direct-current machine to the supply-line and another in the connections from said direct-current machine to the field-magnet of the alternating machine.

2. An alternating-current motor having connections from its armature to a source of alternating-current supply, in combination with a direct-current machine having connections, including switching devices, to a source of direct-current supply, and connections, including other switching devices, to the field-magnet of the alternating motor, the said machines being mechanically connected together.

3. An alternate-current motor having an alternating-current armature and a direct-current field-magnet, in combination with a direct-current machine mechanically connected with the alternating motor and having connections with the field-magnet of said motor, a switch controlling said connections, direct-current-supply lines connected with the direct-current machine, and a switch adapted to open and close said connection without disturbing the connection of the direct-current machine and the motor.

4. A system of electric-power transmission, comprising a set of mains, connections from such mains to alternating-current and direct-current generators, connections from such mains to an alternate-current motor and a direct-current motor, such motors being mechanically connected together, and switching devices in such connections, whereby the same set of mains may connect together the two alternating machines or may connect together the two direct-current machines.

5. The combination of a set of supply-mains, alternating and direct current generators, and means for connecting either of them to such mains, an alternating-current motor having connections from its armature to such mains and having a direct-current field-magnet, and a direct-current machine mechanically connected to such alternating-current motor and having connections, including switches, to such mains and to said field-magnet.

6. The combination of a set of supply-mains, alternating and direct current generators, and means for connecting either of them to such mains, an alternating-current motor having connections through switching devices from its armature to such mains and having a direct-current field-magnet, and a direct-current machine mechanically connected to such alternating motor and having connections, including switches, to such mains and to said field-magnet.

7. The combination, with a set of supply-mains, of an alternating-current generator having connections through switching devices to such mains and having a direct-current field-magnet and a direct-current generator having connections including switching devices and leading, respectively, to such mains and to said field-magnet.

8. The combination of a set of supply-mains, alternating and direct current generators, and means for connecting either of them to such mains, an alternating-current motor having connections from its armature to such mains and having a direct-current field-magnet and a direct-current machine mechanically connected to such alternating-current motor and having connections including switches to such mains and to said field-magnet, and a speed-responsive device actuated by such motors and controlling such switches.

9. The combination of a set of supply-mains, alternating and direct current generators, connections, including switches, from such generators to the mains, an electro-magnetic device in one of such connections and controlling said switches, and distant circuit-breaking devices for such mains.

In witness whereof I have hereunto set my hand this 10th day of September, 1891.

EDWIN WILBUR RICE, JR.

Witnesses:
ALBERT L. ROHRER,
JOHN W. GIBBONEY,